United States Patent
Zhu et al.

(10) Patent No.: US 8,413,001 B2
(45) Date of Patent: Apr. 2, 2013

(54) DETERMINING HYBRID AUTOMATIC REPEAT REQUEST (HARQ) TIMING

(75) Inventors: Jing Zhu, Portland, OR (US); Yujian Zhang, Beijing (CN); Hujun Yin, Saratoga, CA (US)

(73) Assignee: Intel Corporation, Santa Clara, CA (US)

(*) Notice: Subject to any disclaimer, the term of this patent is extended or adjusted under 35 U.S.C. 154(b) by 678 days.

(21) Appl. No.: 12/630,666

(22) Filed: Dec. 3, 2009

(65) Prior Publication Data

US 2011/0138244 A1    Jun. 9, 2011

(51) Int. Cl.
H04L 1/18    (2006.01)
(52) U.S. Cl. .......................... 714/748; 714/751
(58) Field of Classification Search .................. 714/748, 714/751
See application file for complete search history.

(56) References Cited

U.S. PATENT DOCUMENTS

| | | | |
|---|---|---|---|
| 7,594,153 B2* | 9/2009 | Kim et al. | 714/751 |
| 8,239,723 B2* | 8/2012 | Zhang et al. | 714/749 |
| 2009/0276676 A1 | 11/2009 | Lee et al. | |
| 2009/0300456 A1* | 12/2009 | Pelletier et al. | 714/749 |
| 2009/0307559 A1* | 12/2009 | Wu et al. | 714/749 |

OTHER PUBLICATIONS

Shkumbin Hamiti, IEEE 802.16m System Description Document [Draft], IEEE 802.16 Broadband Wireless Access Working Group, Dec. 12, 2008, 163 pages.
International Search Report and Written Opinion for International Patent Application No. PCT/US2010/050126, Mailed Jun. 21, 2011, 8 pages.
Zhang, Yujian et al., "*HARQ Processing Time (AWD-15.2.14.2.2)*", IEEE Session #62, San Francisco, *IEEE* C802.16m-/1459, Jul. 6, 2009, 7 pages.
Kuri, Kenichi, et al., *Long TTI Operation for TDD Frame Structure Related to HARQ Timing* (15.3.9.2.2.1), IEEE 802.16 Broadband Wireless Access Working Group, IEEE C802.16m-/1730, Aug. 29, 2009, 11 pages.
Kwon, Woosuk, et al., "*Synchronous Non-Adaptive HARQ in IEEE 802.16m Uplink*", *IEEE 802.16 Broadband Wireless Access Working Group, IEEE* C802.16m-08/413, May 5, 2008, 6 pages.

* cited by examiner

*Primary Examiner* — Charles Ehne
(74) *Attorney, Agent, or Firm* — Kacvinsky Daisak PLLC

(57) ABSTRACT

A communication apparatus (CA) such as a mobile node/station (MN), a base station (BS), or a radio station (RS) may support determination of HARQ timing. The CA may generate at least in part one or more generalized frames such as a frequency division duplex (FDD) frame or a time division duplex (TDD) frame. The generalized FDD and TDD frames may include support to determine the HARQ timing considering various factors, which may affect the HARQ timing. The FDD and TDD frames may include information corresponding to various factors to determine the HARQ timing considering factors such as DL/UL ratio, number of subframes per frame, variable transmission time interval (TTI), relay zones, legacy IEEE® 802.16e zones, and availability of ACKCH.

20 Claims, 3 Drawing Sheets

FIG. 2

DETERMINING HYBRID AUTOMATIC REPEAT REQUEST (HARQ) TIMING

BACKGROUND

HARQ is widely supported in current wireless communication standards and devices. From timing relationship, HARQ may be of synchronous type or an asynchronous type. Asynchronous HAQ refers to transmissions (or retransmissions) for a HARQ process may occur at any time and explicit signaling of HARQ process number is required. Synchronous HARQ refers to a case of transmissions (or retransmissions) for a HARQ process, which are restricted to occur at know time instants. Explicit signaling of HARQ process number is not required as the process number may be derived from the sub-frame number. In IEEE® 802.16e design for HARQ both downlink and uplink use asynchronous HARQ. In IEEE® 802.16m design for HARQ, asynchronous HARQ is used in downlink while a synchronous HARQ is used in uplink. HARQ timing contributes to latency and level of uniform acknowledgement channel (ACKCH) distribution.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a communication apparatus, which may determine HARQ timing based on various factors such as number of subframes per frame, variable transmission time interval (TTI) length, relay zones, legacy IEEE® 802.16e zones, and availability of ACKCH. In the following description, numerous specific details such as transceiver implementations, resource partitioning, or sharing, or duplication implementations, types and interrelationships of system components are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In one embodiment, a communication apparatus or a station such as mobile node/station (MN), a base station (BS), or a radio station (RS) may support HARQ. In one embodiment, the CA may support asynchronous HARQ downlink (DL) and synchronous HARQ in uplink (UL) and on the other end the BS may support such communication feature as well. In one embodiment, the CA may use a generalized frequency division duplex (FDD) frame and time division duplex (TDD) frame. In one embodiment, the generalized FDD and TDD frames may include support to determine the HARQ timing considering various factors, which may affect the HARQ timing. In one embodiment, the FDD and TDD frames may include support to determine the HARQ timing considering DL/UL ratio, number of sub-frames per frame, variable transmission time interval (TTI), relay zones, legacy IEEE® 802.16e zones, and availability of ACKCH. In one embodiment, the CA may include plurality of factors affecting the HARQ timing to determine an unified HARQ timing.

Figure 1:
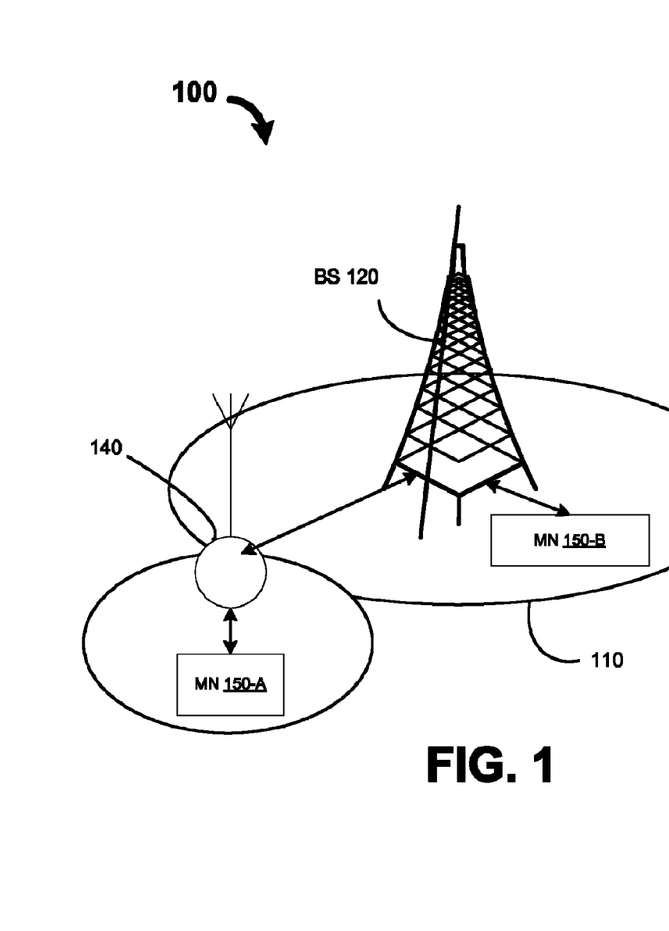
FIG. 1 illustrates an environment 100 comprising one or more communication apparatus (CA) in which HARQ timing may be determined by considering various factors that affect HARQ timing in accordance with one embodiment.

An embodiment of an environment 100, which may include one or more communication apparatus that may determine HARQ timing considering various factors that affect the HARQ timing is illustrated in FIG. 1. In one embodiment, the environment 100 may comprise a coverage area 110, which may include communication apparatuses such as a base station BS 120, a radio station RS, and mobile nodes MN 150. In one embodiment, the mobile node MN 150-A may be coupled to the radio station RS 140 and the RS 140 may be coupled to the BS 120. In one embodiment, the mobile node MN 150-B may be directly coupled to the BS 120. In one embodiment, the MN 150 may include a cell phone, smart phone, personal digital assistant (PDA), mobile internet devices (MIDs), laptops, and such other computing systems. In one embodiment, the MN 150 may represent any device, which may support wireless technologies such as Universal Mobile Telecommunication Systems (UMTS), wideband code division multiple access (WCDMA), worldwide interoperability for microwave access (WiMAX), and long term evolution (LTE).

In one embodiment, the MN 150 may use a variety of multiple access techniques such as frequency division multiplexing (FDM), time division multiplexing (TDM), coded division multiplexing (CDM), orthogonal frequency division multiplexing (OFDM), and single carrier frequency division multiplexing (SC-FDM) and others. In one embodiment, the MN 150-A may be coupled to the BS 120 through a radio station RS 140 using an air interface and the MN 150-B may be coupled to the BS 120 through an air interface. In one embodiment, the communication apparatus MN 150, RS 140, and BS 120 may support generalized FDD and TDD frame structures, which may be generated considering various factors that affect the HARQ timing.

Figure 2:
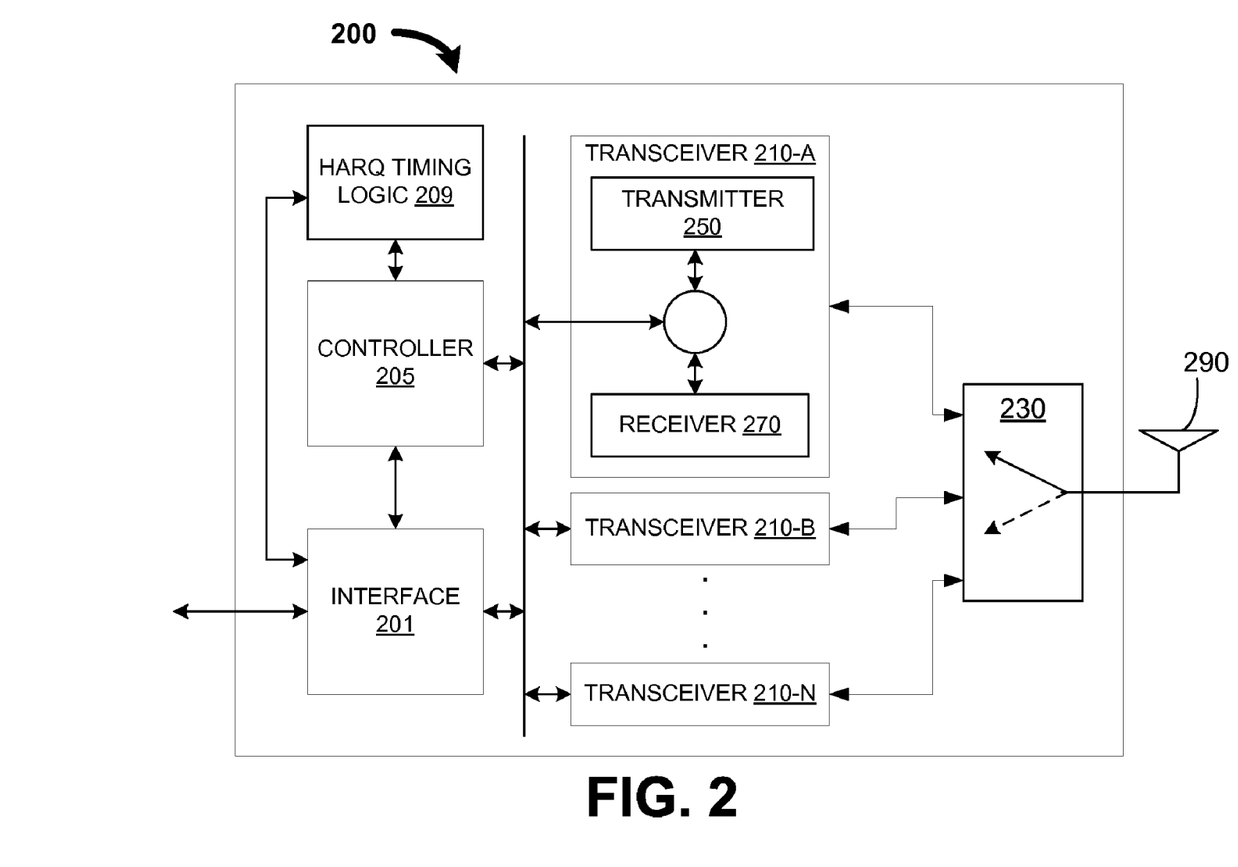
FIG. 2 illustrates a block diagram of a communication apparatus (CA), which may support techniques to determine HARQ timing after considering various factors that affect HARQ timing in accordance with one embodiment.

An embodiment of the CA 200, which may generate and support generalized FDD and TDD frames to determine HARQ timing considering various factors that affect the HARQ timing is illustrated in FIG. 2. In one embodiment, the CA 200 may comprise an interface 201, a controller 205, a HARQ logic 209, one or more transceivers 210-A to 210-N, a switch 230, and an antenna 290. However, the CA 200 may, in other embodiments, comprise a single transceiver, multiple antennas, and such other similar variations. In one embodiment, the CA 200 may be a provisioned as a portion of a network interface card in other scenarios such as a computer platform, a laptop computer, a mobile internet device, handhelds, smart phones, and televisions.

In one embodiment, the interface 201 may couple the CA 200 to other CA or CAs in the environment 100. In one embodiment, the interface 201 may provide physical, electrical, and protocol interface between the CA 200 and the other blocks within the CA 200 and with other CAs coupled to CA 200. In one embodiment, the controller 205 may control the modulation and demodulation techniques selected by the transceivers 210. In one embodiment, the controller 205 may control communication parameters such as the transmission rate, bit error rate, and other such parameters.

In one embodiment, the transceiver 210-A may comprise a transmitter 250 and a receiver 270. In one embodiment, each of the transceiver 210-B to 210-N may comprise a transmitter and receiver similar to the transmitter 250 and the receiver 270 of the transmitter 210-A. In one embodiment, while receiving the signals from the antenna 290, the receivers such as the receiver 270 of the transceivers 210-A to 210-N, may receive the signal from the antenna 290 through a switch 230. In one embodiment, while transmitting the signals, the transmitters such as the transmitter 250 of the transceivers 210 may provide the radio signal to the antenna 290 through the switch 230.

In one embodiment, the transmitter 250 may receive signals to be transmitted from the controller 205 or directly form the interface 201 under the control of the controller 205. In one embodiment, the transmitter 250 may modulate the signals using techniques such as phase, or amplitude, or frequency modulation techniques. In one embodiment, the transmitter 250 may then transmit the signals to the antenna 290 through the switch 230. In one embodiment, the receiver 270 may receive electrical signals from the antenna 290 and demodulate the signals before providing the demodulated signals to the controller 205 or directly to the interface 201.

In one embodiment, the switch 230 may couple a transmitter of the transmitters 210 to the antenna 290 on time sharing basis, for example. In one embodiment, the switch 230 may couple a specific transceiver 210 to the antenna 290 in response to an event such as a selection control signal of the controller 205. In other embodiments, the switch 230 may be provided with intelligence to couple an appropriate transmitter 210 to the antenna 290. In one embodiment, the switch 230 may couple the antenna 290 to the transmitter 250 while the transmitter 250 may be ready to transmit signals out to a receiver in other system. In one embodiment, the switch 230 may couple the antenna 290 to the receiver 270, while the antenna 290 has generated signals to be provided to the receiver 270. In one embodiment, the antenna 290 may be coupled to a switch 230.

In one embodiment, the HARQ logic 209 may at least in part generate generalized FDD and TDD frames. In one embodiment, the HARQ logic 209 may include plurality of factors affecting the HARQ timing into the FDD and TDD frames to determine a unified HARQ timing. In one embodiment, the HARQ logic 209 may use the generalized FDD and TDD frames to determine the HARQ timing considering plurality of factors, which may affect the HARQ timing. In one embodiment, the FDD and TDD frames may include support to determine the HARQ timing considering DL/UL ratio, number of sub-frames per frame, variable transmission time interval (TTI), relay zones, legacy IEEE® 802.16e zones, and availability of ACKCH.

In one embodiment, the HARQ logic 209 may insert fields into the FDD frame and TDD frame and the fields inserted by be used for determining the HARQ timing. In one embodiment, the HARQ logic 209 may use a downlink (DL) zone (a sub-frame), of the FDD DL HARQ frame, for IEEE® 802.16m DL burst transmissions and other sub-frames within the FDD DL HARQ frame may be categorized as DL idle regions. In one embodiment, the HARQ logic 209 may use uplink (UL) zone (a sub-frame), of the FDD DL HARQ frame, may include sub-frames, which may be used for IEEE® 802.16m UL ACKCH transmission.

In one embodiment, the HARQ logic 209 may use a downlink (DL) zone (a sub-frame), of the TDD DL HARQ frame, for IEEE® 802.16m DL burst transmissions. In one embodiment, the HARQ logic 209 may use uplink (UL) zone (a sub-frame), of the TDD DL HARQ frame, may include sub-frames, which may be used for IEEE® 802.16m UL ACKCH transmission. In one embodiment, in FDD HARQ DL frame, both DL and UL zone may be associated with similar transmissions, for example, between BS 120 and MS 150 and/or between BS 120 and RS 140. In one embodiment, the other sub-frames within the TDD DL HARQ frame may be categorized as idle regions.

In one embodiment, the HARQ logic 209 may perform one or more computations of the Equations (1) to (14) descried below to determine the HARQ timing. In one embodiment, the HARQ logic 209 may be provisioned in communication apparatus 200 may allow the CA 200 to determine the HARQ timing in both the uplink and downlink using FDD and TDD frames such as frames 400 and 500 described below. In one embodiment, the HARQ logic 209 may be implemented in a hardware, software, firmware or a combination thereof.

Figure 3:
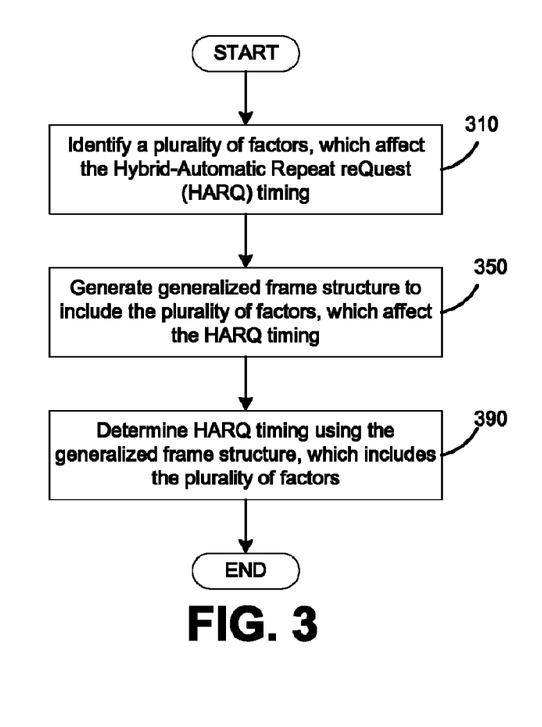
FIG. 3 is a flow-chart illustrates an technique used by the CA 200 to determine HARQ timing based on various factors that affect HARQ timing in accordance with one embodiment.

A flow-chart 300 depicting an operation of the CA 200 to determine HARQ timing based on various factors that affect HARQ timing is illustrated in FIG. 3. In block 310, the HARQ logic 209 may identify a plurality of factors, which may affect the HARQ timing. In one embodiment, the plurality of factors may include DL/UL ratio, number of sub-frames per frame, variable transmission time interval (TTI), relay zones, legacy IEEE® 802.16e zones, and availability of ACKCH.

In one embodiment, the plurality of factors may include:

1) Number of sub-frames per frame: For 5/10/20 MHz system bandwidth, each frame may comprise 8 sub-frames; for 7 MHz system bandwidth, each frame may comprise 6 sub-frames; and for 8 MHz system bandwidth, each frame may comprise 7 sub-frames;

2) Variable TTI length: A TTI may comprise multiple sub-frames;

3) Legacy IEEE 802.16e zones: On mixing with legacy zones, the available DL/UL sub-frames for IEEE® 802.16m transmissions may be different;

4) Relay zones: HARQ timing may be defined for each CA; and

5) Availability of ACKCH: For a A-MAP configured with n=2, some DL sub-frames may not contain A-MAP and DL ACKCH may not be transmitted.

In block 350, the HARQ logic 209 may generate at least in part one or more generalized frame structure, which may include the plurality of factors that affect the HARQ timing. In one embodiment, the generalized FDD and TDD frame structures may be as shown in FIG. 4 and FIG. 5.

In block 390, the HARQ logic 209 may determine HARQ timing using the generalized frame structures. In one embodiment, the approach by which the HARQ logic 209 may determine the HARQ timing using generalized frame structures FDD 400 and TDD 500 is described below.

Figure 4:
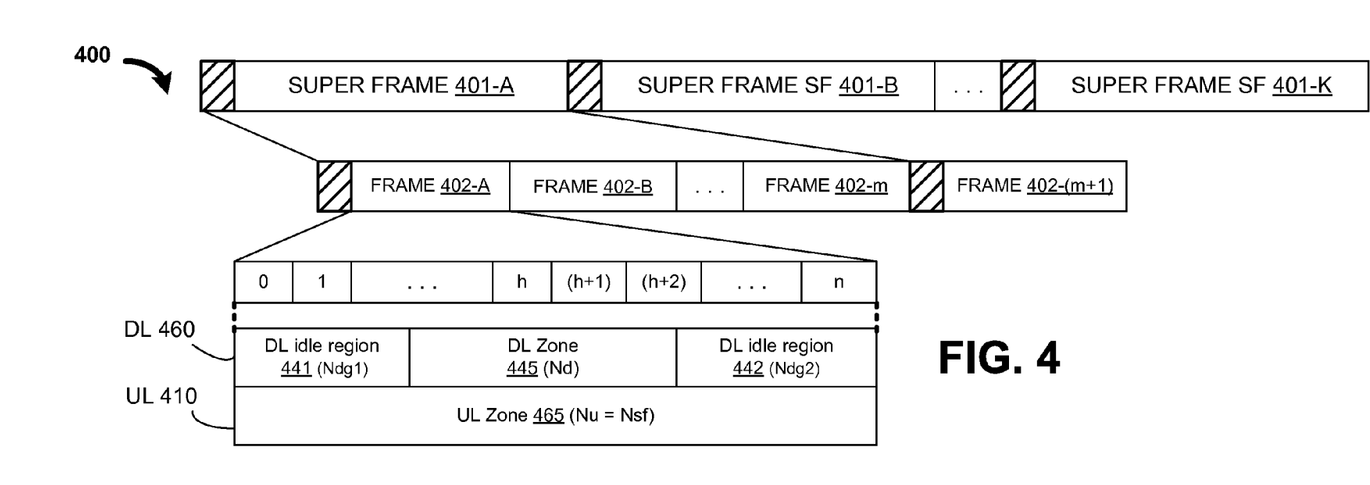
FIG. 4 is a frame structure illustrating frequency division duplex (FDD) HARQ timing control in accordance with one embodiment.
Figure 5:
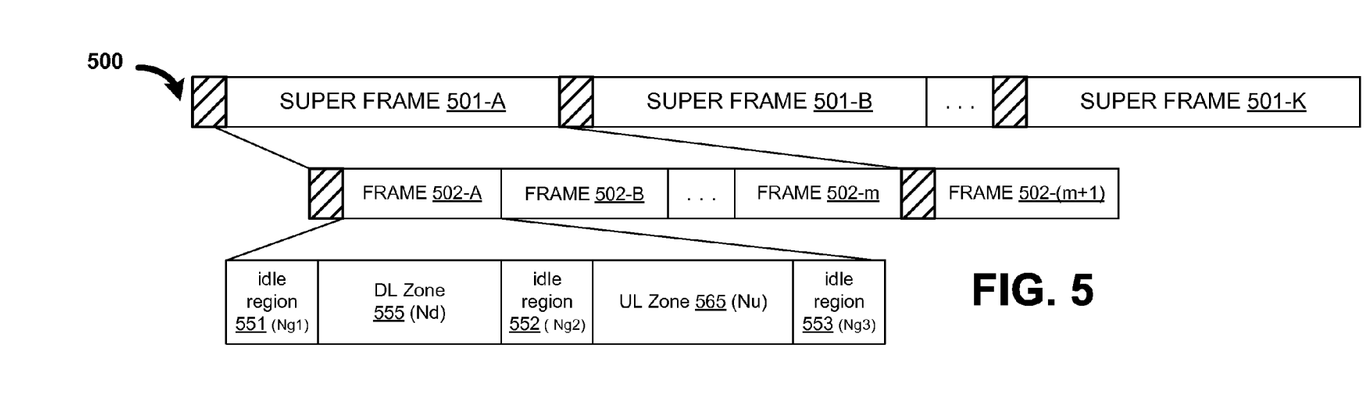
FIG. 5 is a frame structure illustrating time division duplex (TDD) HARQ timing control in accordance with one embodiment.

An embodiment of a generalized FDD frame structure 400 is depicted in FIG. 4. In one embodiment, the structure 400 may comprise super frames SF 401-A to 401-K. In one embodiment, each super-frame 401 may comprise one or more frames 402 and in one embodiment, the super-frame 401-A may comprise 'm' frames 402-A to 402-m and a first frame of the next frame 401-B may start with an index of (m+1). In one embodiment, the frame 402-A may include downlink (DL) sub-frames DL 410 and uplink (UL) sub-frames UL 460. In one embodiment, the DL sub-frame 410 and UL sub-frame F430 may comprise 'n' (=0 to n) sub-frames. In one embodiment, the DL sub-frame 410 may comprise a first DL idle region Ndg 441 and a second DL idle region 442 and a DL zone (Nd) 445 interposed between the two DL idle regions 441 and 442. In one embodiment, the UL sub-frame 460 may comprise a UL zone (Nu) 465.

In one embodiment, the following notations may be used:

Floor of x (Floor<x>): The floor of X, i.e., the largest integer less than or equal to X (e.g., if X=3.21, Floor<x>=3.00);

Ceiling of x (Ceil<x>): The ceiling of X, i.e., the smallest integer greater than or equal to X (e.g., if X=3.21, Ceil<x>=4.00);

Pair ($m_{TX}$, $n_{TX}$): starting sub-frame position of data burst transmission or retransmission;

Pair ($m_{ACK}$, $n_{ACK}$): sub-frame position for ACKCH associated with data burst transmission or retransmission ($m_{TX}$, $n_{TX}$);

Pair ($m_{RETX}$, $n_{RETX}$): starting sub-frame position of data burst retransmission associated with data burst transmission or retransmission ($m_{TX}$, $n_{TX}$);

Pair ($m_{A-MAP}$, $n_{A-MAP}$): sub-frame position of A-MAP scheduling data burst transmission or retransmission ($m_{TX}$, $n_{TX}$);

$\Delta m_{TX-AMPA} = m_{TX} - m_{A-MAP}$; $\Delta m_{ACK-TX} = m_{ACK} - m_{TX}$; $\Delta m_{RETX-ACK} = m_{RETX} - m_{ACK}$;

$N_{sf}$: Total number of sub-frames per frame;

$N_{TTI}$: TTI length of data burst transmission (or retransmission) in terms of number of sub-frames;

$P_{RX}$: Receiver processing time in terms of number of sub-frames. Preferred value for $P_{RX}$ is 3, however, $P_{RX}$ may take other values;

$P_{TX}$: Transmitter processing time in terms of number of sub-frames. Preferred value for $P_{TX}$ is 2, however, $P_{TX}$ may take other values;

$N_{A-MAP}$: A-MAP transmission frequency. A-MAP regions are located $N_{A-MAP}$ sub-frames apart. If a A-MAP region is allocated in sub-frame 'n', the next A-MAP region is in sub-frame (n+$N_{A-MAP}$) of the same sub-frame 'n'. The value of $N_{A-MAP}$ may be equal to 1 or 2.

In one embodiment, the symbols $N_{sf}$, $N_{TTI}$, $P_{RX}$, $P_{TX}$, and $N_{A-MAP}$ may be used in determining HARQ timing. Suitable numerals may be substituted for symbols $N_{sf}$, $N_{TTI}$, $P_{RX}$, $P_{TX}$, and $N_{A-MAP}$.

In one embodiment, the FDD frame structure of FIG. 4 may be used to determine HARQ timing and DL zone 445 may comprise 'Nd' sub-frames, while UL zone 465 may comprise $N_u = N_{sf}$ sub-frames. In one embodiment, the UL 410 may comprise DL idle regions 441 and 442, respectively, with a length of $N_{dg1}$ and $N_{dg2}$. In one embodiment, the length of the UL zone 465 may equal $N_{sf}$=(Ndg1+Nd+Ndg2). However, $N_{dg1}$ and $N_{dg2}$ may equal zero as well. For example, if $N_{dg2}$=0, the term $N_{dg2}$ may not exist in the HARQ timing equations.

For FDD DL HARQ, DL zone 445 of FIG. 4 may include sub-frames, which may be used for IEEE® 802.16m DL data burst transmissions and other sub-frames within the frame 402-A may be categorized as DL idle regions. Also, for FDD DL HARQ, UL zone 465 of FIG. 4 may include sub-frames, which may be used for IEEE® 802.16m UL ACKCH transmissions.

Timing Relationship Between Dl Assignment in A-MAP and DL Data Burst Transmission:

While $n_{A-MAP}$=1, DL data burst transmission corresponding to a DL assignment A-MAP information element (IE) in sub-frame ($m_{A-MAP}$, $n_{A-MAP}$) may begin in sub-frame ($m_{A-MAP}$, $n_{A-MAP}$) (i.e., $m_{TX} = m_{A-MAP}$, and $n_{TX} = n_{A-MAP}$).

While $n_{A-MAP}$=2, a bit 'i' may exist such that i∈{0,1} in DL assignment A-MAP information element (IE) in sub-frame ($m_{A-MAP}$, $n_{A-MAP}$) and the corresponding DL data burst transmission may begin in sub-frame ($m_{A-MAP}$, $n_{A-MAP}$+'i') (i.e., $m_{TX} = M_{A-MAP}$, and $n_{TX} = n_{A-MAP}$+'i'). If Nd is odd and $n_{A-MAP} = N_{dg1} + N_d - 1$, 'i' may equal 0.

Timing Relationship Between DL Data Burst Transmission and ACKCH:

For DL data burst with the start sub-frame transmitted in sub-frame ($m_{TX}$, $n_{TX}$), ACKCH may be transmitted in sub-frame ($m_{ACK}$, $n_{ACK}$). To calculate ($m_{ACK}$, $n_{ACK}$), the HARQ logic 209 may be use Equation (1) below.

$$\Delta m_{ACK-TX} = FLOOR<(n_{TX}+N_{TTI}+P_{RX})/N_{sf}>;$$

$$n_{ACK} = (n_{TX}+N_{TTI}+P_{RX} - \Delta m_{ACK-TX}*N_{sf}) \quad \text{Equation (1)}$$

Timing Relationship Between DL Data Burst Retransmission and ACKCH:

For DL data burst with the start sub-frame transmitted in sub-frame ($m_{TX}$, $n_{TX}$), start sub-frame position for DL data burst retransmission may be sub-frame ($m_{RETX}$, $n_{RETX}$). In one embodiment, as the HARQ logic 209 may use asynchronous HARQ for downlink, the timing for retransmission may be controlled by the base station such as BS 120, while transmitting information to a mobile node 150-A, for example.

In one embodiment, the HARQ logic 209 may use Equation (2) below to determine a reference timing to guarantee both minimum Tx processing time and same starting sub-frame position for transmission and retransmissions.

$$m_{RETX-ACK} = FLOOR<(n_{ACK}+P_{TX}-n_{TX})/N_{sf}>+1;$$

$$n_{RETX} = n_{TX} \quad \text{Equation (2)}$$

For FDD UL HARQ, DL zone 445 of FIG. 4 may include sub-frames, which may be used for IEEE® 802.16m DL ACKCH transmissions. Other sub-frames within the frame 402-A may be categorized as DL idle regions. Also, for FDD UL HARQ, UL zone 465 of FIG. 4 may include sub-frames, which may be used for IEEE® 802.16m UL data burst transmissions.

Timing Relationship Between DL Assignment in A-MAP and UL Data Burst Transmission:

In one embodiment, for a UL data burst transmission corresponding to a UL assignment A-MAP IE in sub-frame ($M_{A-MAP}$, $n_{A-MAP}$) may begin in sub-frame ($m_{TX}$, $n_{TX}$). In one embodiment, the HARQ logic 209 may determine the start frame $n_{TX}$ using the Equation (3) below.

$$n_{TX}=(N_{dg1}+\text{FLOOR}<(n_{A\text{-}MAP}-N_{dg1})*N_{sf}/N_d>+P_{RX}+1+i) \bmod N_{sf};$$

$$\Delta m_{TX\text{-}AMAP}=\text{FLOOR}<(n_{A\text{-}MAP}+P_{TX}-n_{TX})/N_{sf}>+1;$$

$$i \in \{0 \ldots \text{CEIL}<N_{sf}/\text{CEIL}<N_d/N_{A\text{-}MAP}>>-1\} \quad \text{Equation (3)}$$

If $N_d=N_{sf}$, parameter 'i' may be 0; otherwise, the HARQ logic 209 may signal 'i' using A-MAP.

Timing Relationship Between UL Data Burst Transmission and ACKCH:

For UL data burst with the start sub-frame transmitted in sub-frame ($m_{TX}$, $n_{TX}$), ACKCH may be transmitted in sub-frame ($m_{ACK}$, $n_{ACK}$). To calculate ($m_{ACK}$, $n_{ACK}$), the HARQ logic 209 may be use Equation (4) below.

$$\Delta m_{TX\text{-}ACK}=\text{FLOOR}<(n_{TX}+P_{RX}+N_{TTI}-1-n_{A\text{-}MAP})/N_{sf}>+1;$$

$$n_{ACK}=n_{A\text{-}MAP} \quad \text{Equation (4)}$$

Timing Relationship Between UL Data Burst Retransmission and ACKCH:

For UL data burst with the start sub-frame transmitted in sub-frame ($m_{TX}$, $n_{TX}$), start sub-frame position for UL data burst retransmission may be in sub-frame ($m_{RETX}$, $n_{RETX}$). In one embodiment, as the HARQ logic 209 may use Equation (2) above to determine the start sub-frame position ($M_{RETX}$, $n_{RETX}$) of UL data burst retransmission.

An embodiment of a generalized TDD frame structure 500 is depicted in FIG. 5. In one embodiment, the TDD frame structure 500 may comprise super frames 501-A to 501-K. In one embodiment, each super-frame 501 may comprise one or more frames 502 and in one embodiment, the super-frame 501-A may comprise 'm' frames 502-A to 402-m and a first frame of the next frame 501-B may start with an index of (m+1). In one embodiment, the frame 502-A may include 'n' downlink (DL) and uplink sub-frames. In one embodiment, the DL and UL sub-frames may comprise 'n' (=0 to n) sub-frames. In one embodiment, the DL and UL sub-frames may comprise a first idle region 551, a second idle region 552, and a third idle region 553. In one embodiment, the length of the idle regions 551, 552, and 553 may equal $N_{g1}$, $N_{g2}$, and $N_{g3}$, respectively. In one embodiment, a DL zone 555 of length ($N_d$) may be interposed between the first and second idle regions 551 and 552. In one embodiment, the UL zone 565 of length (Nu) may be interposed between the second and the third idle regions 552 and 553. In other embodiment, $N_d$ may represent a number of DL sub-frames with each sub-frame having a length of (L1) and $N_u$ may represent a number of UL sub-frames with each sub-frame having a length of (L2). In one embodiment, the length of the sub-frame 502-A may equal $N_{sf}=(N_{g1}+N_d+N_{g2}+N_u+N_{g3})$. However, $N_{g1}$, $N_{g2}$, and $N_{g3}$ may equal zero as well. For example, if $N_{g3}=0$, the term $N_{g3}$ may not exist in the HARQ timing equations.

For TDD DL HARQ, DL zone 555 of FIG. 5 may include sub-frames, which may be used for IEEE® 802.16m DL data burst transmissions. In one embodiment, the UL zone 565 of FIG. 5 may include sub-frames, which may be used for IEEE® 802.16m UL ACKCH transmissions. In one embodiment, other sub-frames within the frame 502-A may be categorized as idle regions.

Timing Relationship Between DL Assignment in A-MAP and DL Data Burst Transmission:

While $n_{A\text{-}MAP}=1$, DL data burst transmission corresponding to a DL assignment A-MAP information element (IE) in sub-frame ($M_{A\text{-}MAP}$, $n_{A\text{-}MAP}$) may begin in sub-frame ($m_{A\text{-}MAP}$, $n_{A\text{-}MAP}$) (i.e., $m_{TX}=m_{A\text{-}MAP}$, and $n_{TX}=n_{A\text{-}MAP}$).

While $n_{A\text{-}MAP}=2$, a bit 'i' may exist such that $i \in \{0,1\}$ in DL assignment A-MAP IE in sub-frame ($m_{A\text{-}MAP}$, $n_{A\text{-}MAP}$) and the corresponding DL data burst transmission may begin in sub-frame ($M_{A\text{-}MAP}$, $n_{A\text{-}MAP}+$'i') (i.e., $m_{TX}=m_{A\text{-}MAP}$, and $n_{TX}=n_{A\text{-}MAP}+$'i'). If Nd is odd and $n_{A\text{-}MAP}=N_{g1}+N_d-1$, 'i' may equal 0.

Timing Relationship Between DL Data Burst Transmission and ACKCH:

For DL data burst with the start sub-frame transmitted in sub-frame ($m_{TX}$, $n_{TX}$), ACKCH may be transmitted in sub-frame ($m_{ACK}$, $n_{ACK}$). To calculate ($m_{ACK}$, $n_{ACK}$), the HARQ logic 209 may be use one of Equations (5), (6), and (7) below.

In one embodiment, the HARQ logic 209 may determine the HARQ timing using Equation (5) below while minimizing the ACKCH latency.

$$\Delta m_{ACK\text{-}TX}=\text{FLOOR}<(n_{TX}+N_{TTI}+P_{RX}+N_{g3})/N_{sf}>;$$

$$n_{ACK}=\max[(N_{g1}+N_d+N_{g2}),(n_{TX}+N_{TTI}+P_{RX}\Delta m_{ACK\text{-}TX}*N_{sf})] \quad \text{Equation (5)}$$

In one embodiment, the HARQ logic 209 may determine the HARQ timing using Equation (6) below while optimizing the distribution of ACKCH uniformly.

$$n_{ACK}=(N_{g1}+N_d+N_2+\text{FLOOR}<(n_{TX}-N_{g1})*N_u/(N_d-N_{TTI}+1)>$$

$$\Delta m_{ACK\text{-}TX}=\text{FLOOR}<(n_{TX}+N_{TTI}-1+P_{RX}-n_{ACK})/N_{sf}>+1 \quad \text{Equation (6)}$$

In one embodiment, the HARQ logic 209 may determine the HARQ timing using Equation (7) below to minimize the ACKCH latency while optimizing the distribution of ACKCH uniformly.

$$n_{ACK}=\min\{(N_{sf}-1-N_{g3}),\max[(N_{g1}+N_d+N_{g2}),(n_{TX}+N_{TTI}+X)]\}$$

$$\Delta m_{ACK\text{-}TX}=\max(0,1-\text{FLOOR}<(n_{ACK}-n_{TX}-N_{TTI})/P_{RX}>) \quad \text{Equation (7)}$$

wherein the HARQ logic 209 may set the parameter 'X' to equal $P_{RX}$ for minimizing latency or to a value as given in Equation (8) below for uniform distribution of ACKCH.

$$X=\{2, \text{ for } N_{sf}=6; \text{ and } 3 \text{ for } N_{sf}>6\} \quad \text{Equation (8)}$$

Timing Relationship Between DL Data Burst Retransmission and ACKCH:

For DL data burst with the start sub-frame transmitted in sub-frame ($m_{TX}$, $n_{TX}$), start sub-frame position for DL data burst retransmission may be in sub-frame ($m_{RETX}$, $n_{RETX}$). In one embodiment, as the HARQ logic 209 may use asynchronous HARQ for downlink, the timing for retransmission may be controlled by the base station such as BS 120, while transmitting information to a mobile node 150-A, for example.

In one embodiment, the HARQ logic 209 may use Equation (2) above to determine a reference timing to guarantee both minimum Tx processing time and same starting sub-frame position for transmission and retransmissions.

For TDD UL HARQ, DL zone 555 of FIG. 5 may include sub-frames, which may be used for IEEE® 802.16m DL ACKCH transmissions. Also, for FDD UL HARQ, UL zone 565 of FIG. 5 may include sub-frames, which may be used for IEEE® 802.16m UL data burst transmissions. Other sub-frames within the frame 502-A may be categorized as idle regions.

Timing Relationship Between DL Assignment in A-MAP and UL Data Burst Transmission:

In one embodiment, for a UL data burst transmission corresponding to a UL assignment A-MAP IE in sub-frame ($M_{A\text{-}MAP}$, $n_{A\text{-}MAP}$) may begin in sub-frame ($m_{TX}$, $n_{TX}$). In one embodiment, the HARQ logic 209 may determine the start frame $n_{TX}$ using the Equation (9) below.

$$n_{TX} = N_{g1} + N_d + N_{g2} + \text{FLOOR} < (n_{A\text{-}MAP} - N_{g1}) * N_u / N_d > + i;$$

$$\Delta m_{TX\text{-}AMAP} = \text{FLOOR} < (n_{A\text{-}MAP} + P_{TX} - n_{TX}) / N_{sf} > + 1; \quad \text{Equation (9)}$$

If $[\text{CEIL} < N_d / N_{A\text{-}MAP} >] >= N_u$ or if $N_{TTI}$ is not equal 1, parameter 'i' may be 0; otherwise, the HARQ logic 209 may signal 'i' using A-MAP with the range defined as $i \in \{0 \ldots \text{CEIL} < N_u / \text{CEIL} < N_d / N_{A\text{-}MAP} >> -1\}$.

In other embodiment, the HARQ logic 209 may use the same timing of DL-HARQ as given by Equation (10) below.

$$n_{TX} = \min\{(N_{sf} - 1 - N_{g3}), \max[(N_{g1} + N_d + N_{g2}), (n_{A\text{-}MAP} - y + i + 1 + X)]\};$$

$$\Delta m_{TX} = \max[0, (1 - \text{FLOOR} < (n_{TX} - n_{A\text{-}MAP} - 1) / P_{RX} >)] \quad \text{Equation (10)}$$

wherein, in one embodiment, the HARQ logic 209 may set the parameter 'X' to equal $P_{RX}$ for minimizing latency or to $\{2, \text{ for } N_{sf} = 6; \text{ and } 3 \text{ for } N_{sf} > 6\}$ for uniform distribution of ACKCH. In one embodiment, the HARQ logic 209 may A-MAP to signal 'i' with values such as $i \in \{0, 1, 2, 3\}$. In one embodiment, the HARQ logic 209 may determine the value of 'y' using Equation (11) below If $((N_d + N_{g2} < 1 + X) \ \&\& \ (n_{A\text{-}MAP} == N_{g1}))$, $$y = \min[(1 + X - N_d - N_{g2}), (N_u - 1)], \text{ else } y = 0 \quad \text{Equation (11)}$$

Timing Relationship Between UL Data Burst Transmission and ACKCH:

For UL data burst with the start sub-frame transmitted in sub-frame ($m_{TX}$, $n_{TX}$), ACKCH may be transmitted in sub-frame ($m_{ACK}$, $n_{ACK}$). To calculate ($m_{ACK}$, $n_{ACK}$), the HARQ logic 209 may be use Equations (12), (13), and (14) below.

In one embodiment, the HARQ logic 209 may determine the HARQ timing using Equation (12) below while minimizing the ACKCH latency.

$$\Delta m_{TX\text{-}ACK} = \text{FLOOR} < (n_{TX} + N_{TTI} + P_{RX} + N_d + N_{g2} + N_u + N_{g3} - 1 - N_{A\text{-}MAP} \text{FLOOR} < ((N_d - 1) / N_{A\text{-}MAP})>) / N_{sf};$$

$$n_{ACK} = N_{g1} + \max(0, N_{A\text{-}MAP} \text{CEIL} < (n_{TX} + N_{TTI} + P_{RX} - \Delta m_{TX\text{-}ACK} * N_{sf} - N_{g1}) / N_{A\text{-}AMP} >) \quad \text{Equation (12)}$$

In one embodiment, the HARQ logic 209 may determine the HARQ timing using Equation (13) below while distributing ACKCH uniformly.

$$\Delta m_{TX\text{-}ACK} = \text{FLOOR} < (n_{TX} + P_{RX} + N_{TTI} - 1 - n_{A\text{-}MAP}) / N_{sf} > +1;$$

$$n_{ACK} = n_{A\text{-}MAP} \quad \text{Equation (13)}$$

In one embodiment, the HARQ logic 209 may determine the HARQ timing using Equation (14) below while determining the timing of ACKCH.

$$n_{ACK} = n_{A\text{-}MAP};$$

$$\Delta m_{ACK} = \max(0, 1 - \text{FLOOR} < (n_{ACK} + N_{sf} - n_{TX} - N_{TTI}) / P_{RX} >) + 1 \quad \text{Equation (14)}$$

Timing Relationship Between UL Data Burst Retransmission and ACKCH:

For UL data burst with the start sub-frame transmitted in sub-frame ($m_{TX}$, $n_{TX}$), start sub-frame position for UL data burst retransmission may be in sub-frame ($m_{RETX}$, $n_{RETX}$). In one embodiment, as the HARQ logic 209 may use Equation (2) above to determine the start sub-frame position ($m_{RETX}$, $n_{RETX}$) of UL data burst retransmission.

In one embodiment, the HARQ logic 209 may use the generalized frames 400 or 500 to determine the HARQ timing in relay scenarios as well. In one embodiment, the DL HARQ may be used in scenarios while data burst transmission occurs in DL zone 455 or 555. For example, the BS 120 may transmit downlink frames FDD 400 or TDD 500 and MN 150-A may receive, BS 120 may transmit downlink frames FDD 400 or TDD 500 and RS 140 may receive the frames 400 or 500, RS 140 may transmit downlink frames FDD 400 or TDD 500 and MN 150-A may receive the frames 400 or 500. In one embodiment, the even-hop RS may transmit downlink frames FDD 400 or TDD 500 and odd-hop RS may receive the frames 400 or 500 and the odd-hop RS may transmit downlink frames FDD 400 or TDD 500 and odd-hop RS may receive the frames 400 or 500.

In one embodiment, the UL HARQ may be used in scenarios while data burst transmission occurs in UL zone 465 or 565. For example, the MN 150-B may transmit uplink frames FDD 400 or TDD 500 and BS 120 may receive the frames 400 or 500, RS 140 may transmit uplink frames FDD 400 or TDD 500 and BS 120 may receive the frames 400 or 500, MN 150-B may transmit uplink frames FDD 400 or TDD 500 and RS 140 may receive the frames 400 or 500. In one embodiment, the even-hop RS may transmit uplink frames FDD 400 or TDD 500 and odd-hop RS may receive the frames 400 or 500 and the odd-hop RS may transmit uplink frames FDD 400 or TDD 500 and odd-hop RS may receive the frames 400 or 500.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A communication apparatus to determine hybrid automatic repeat request (HARQ) timing, comprising:
   a transmitter coupled to a transmit portion of a channel,
   a receiver coupled to a receive portion of the channel, and
   a hybrid automatic repeat request (HARQ) logic coupled to the transmitter and the receiver,
   wherein the HARQ logic is to determine HARQ timing after considering a plurality of factors, which affect HARQ timing,
   wherein the HARQ logic is to generate one or more super-frames according to a generalized frame structure in which the plurality of factors affecting the HARQ timing are included to determine a unified HARQ timing, each of the one or more super-frames comprising one or more frames.

2. The apparatus of claim 1, wherein the HARQ logic is to include the plurality of factors into a downlink zone and an uplink zone of at least one of the one or more frames in at least one of the one or more super-frames, wherein the plurality of factors include a total number of sub-frames ($N_{sf}$) present in the at least one frame, a variable transmission time interval ($N_{TTI}$) length of the data burst transmissions, a receiver processing time ($P_{RX}$), a transmitter processing time ($P_{TX}$), and an advance MAP transmission frequency ($N_{A\text{-}MAP}$).

3. The apparatus of claim 1, wherein the HARQ logic is to determine the HARQ timing to reduce a latency of transmission or retransmission.

4. The apparatus of claim 1, wherein the HARQ logic is to generate a frequency division duplex (FDD) super-frame comprising an FDD HARQ frame, wherein the FDD HARQ frame is to include a downlink zone, other idle regions, and a uplink zone, wherein for a FDD downlink HARQ, the downlink zone includes sub-frames used for downlink data burst transmissions, wherein the downlink zone is interposed between a first and second downlink idle regions of the other idle regions.

5. The apparatus of claim 4, wherein for the FDD downlink HARQ, the uplink zone includes sub-frames used for uplink acknowledgement channel transmissions, wherein a length of the uplink zone is equal to a sum of lengths of the downlink zone, the first idle region and the second idle region.

6. The apparatus of claim 4, wherein for a FDD uplink HARQ, the downlink zone includes sub-frames used for downlink acknowledgement channel transmissions and the uplink zone includes sub-frames used for uplink data burst transmissions.

7. The apparatus of claim 1, wherein the HARQ logic is to generate a time division duplex (TDD) super-frame comprising a TDD HARQ frame, wherein the TDD HARQ frame is to include a downlink zone, other idle regions, and a uplink zone, wherein for a TDD downlink HARQ, the downlink zone includes sub-frames used for downlink data burst transmissions, wherein the downlink zone is interposed between a first and a second idle region of the other idle regions.

8. The apparatus of claim 7, wherein for the TDD downlink HARQ, the uplink zone includes sub-frames used for uplink acknowledgement channel transmissions, wherein the uplink zone is interposed between the second idle region and a third idle region, wherein a length of the TDD HARQ frame equals a sum of lengths of the uplink zone, the downlink zone, the first idle region, the second idle region, and the third idle region.

9. The apparatus of claim 7, wherein for a TDD uplink HARQ, the downlink zone includes sub-frames used for downlink acknowledgement channel transmissions and the uplink zone includes sub-frames used for uplink data burst transmissions.

10. The apparatus of claim 1, wherein the HARQ logic is to use at least one of the one or more super-frames to determine the HARQ timing for a relay link.

11. A method to determine hybrid automatic repeat request (HARQ) timing in a communication apparatus, comprising:

determining unified HARQ timing using a HARQ logic, wherein the unified HARQ timing is determined after considering a plurality of factors, which affect HARQ timing, wherein the unified HARQ timing is determined using one or more super-frames generated by the HARQ logic according to a generalized frame structure, each of the one or more super-frames comprising one or more frames, wherein a plurality of factors affecting the unified HARQ timing are included into at least one of the one or more frames in at least one of the one or more super-frames.

12. The method of claim 11, comprising including the plurality of factors into a downlink zone and an uplink zone of the at least one of the one or more frames in the at least one of the one or more super-frames, wherein the plurality of factors include a total number of sub-frames ($N_{sf}$) present in the at least one frame, a variable transmission time interval ($N_{TTI}$) length of the data burst transmissions, a receiver processing time ($P_{RX}$), a transmitter processing time ($P_{TX}$), and an advance MAP transmission frequency ($N_{A-MAP}$).

13. The method of claim 11, comprising reducing a latency of transmission while maintaining a uniform distribution of an acknowledgement channel.

14. The method of claim 11, further comprising generating a frequency division duplex (FDD) super-frame comprising an FDD HARQ frame, wherein the FDD HARQ frame is to include a downlink zone, other idle regions, and a uplink zone, wherein for a FDD downlink HARQ, the downlink zone includes sub-frames used for downlink data burst transmissions, wherein the downlink zone is interposed between a first and second downlink idle regions of the other idle regions.

15. The method of claim 14, wherein for the FDD downlink HARQ, the uplink zone includes sub-frames used for uplink acknowledgement channel transmissions, wherein a length of the uplink zone is equal to a sum of lengths of the downlink zone, the first idle region and the second idle region.

16. The method of claim 14, wherein for a FDD uplink HARQ, the downlink zone includes sub-frames used for downlink acknowledgement channel transmissions and the uplink zone includes sub-frames used for uplink data burst transmissions.

17. The method of claim 11, comprising generating a time division duplex (TDD) super-frame comprising a TDD HARQ frame, wherein the TDD HARQ frame is to include a downlink zone, other idle regions, and an uplink zone, wherein for a TDD downlink HARQ, the downlink zone includes sub-frames used for downlink data burst transmissions, wherein the downlink zone is interposed between a first and a second idle region of the other idle regions.

18. The method of claim 17, comprising including sub-frames into the downlink zone that are used for uplink acknowledgement channel transmissions for the TDD downlink HARQ, wherein the uplink zone is interposed between the second idle region and a third idle region, wherein a length of a total number of frames in the TDD HARQ frame equals a sum of lengths of the uplink zone, the downlink zone, the first idle region, the second idle region, and the third idle region.

19. The method of claim 17, comprising:

including sub-frames into the downlink zone that are used for downlink acknowledgement channel transmissions for a TDD uplink HARQ, and including sub-frames into the uplink zone that are used for uplink data burst transmissions for the TDD uplink HARQ.

20. The method of claim 11, comprising using at least one of the one or more super-frames to determine the HARQ timing for a relay link.

* * * * *

UNITED STATES PATENT AND TRADEMARK OFFICE
CERTIFICATE OF CORRECTION

PATENT NO. : 8,413,001 B2
APPLICATION NO. : 12/630666
DATED : April 2, 2013
INVENTOR(S) : Jing Zhu et al.

It is certified that error appears in the above-identified patent and that said Letters Patent is hereby corrected as shown below:

Title Page, Item (56), in column 2, under "Other Publications", line 8, delete "16m-/" and insert -- 16m-09/ --, therefor.

Title Page, Item (56), in column 2, under "Other Publications", line 12, delete "16m-/" and insert -- 16m-09/ --, therefor.

Signed and Sealed this
Twenty-first Day of May, 2013

Teresa Stanek Rea
*Acting Director of the United States Patent and Trademark Office*